United States Patent
Chen et al.

(10) Patent No.: US 10,656,433 B2
(45) Date of Patent: May 19, 2020

(54) METHOD AND APPARATUS FOR VIEWING AN IMAGE

(71) Applicant: THOMSON LICENSING, Issy de Moulineaux (FR)

(72) Inventors: Ren Lei Chen, Beijing (CN); Jianping Song, Beijing (CN); Lin Du, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 248 days.

(21) Appl. No.: 14/758,488

(22) PCT Filed: Dec. 29, 2012

(86) PCT No.: PCT/CN2012/087934
§ 371 (c)(1),
(2) Date: Jun. 29, 2015

(87) PCT Pub. No.: WO2014/101150
PCT Pub. Date: Jul. 3, 2014

(65) Prior Publication Data
US 2015/0338673 A1    Nov. 26, 2015

(51) Int. Cl.
*G02B 30/24*    (2020.01)
*G09G 3/36*    (2006.01)
(Continued)

(52) U.S. Cl.
CPC .......... *G02B 30/24* (2020.01); *G02B 26/0883* (2013.01); *G02B 27/1066* (2013.01);
(Continued)

(58) Field of Classification Search
CPC ............ G02B 27/2264; G02B 26/0883; G02B 27/1066; G02B 27/126; G02B 30/24;
(Continued)

(56) References Cited

U.S. PATENT DOCUMENTS 5,224,198 A    6/1993   Jachimowicz et al.
2008/0273178 A1*  11/2008  Li .................... G03B 21/005
                                                    353/81
(Continued)

FOREIGN PATENT DOCUMENTS

CN    2140069    8/1993
CN    2215730    12/1995
(Continued)

OTHER PUBLICATIONS

Cole, "Virtual displays and the future of mobile and portable devices", IEEE Pervasive Computing, Apr.-Jun. 2005, p. 6.
(Continued)

*Primary Examiner* — Sath V Perungavoor
*Assistant Examiner* — Kristin Dobbs
(74) *Attorney, Agent, or Firm* — Patricia A. Verlangieri

(57) ABSTRACT

It is provided a method for viewing an image that is wider or higher than the display screen, wherein, the image is evenly divided into two portions by using a line passing through centers of larger edges of the image compared to the display screen. The method comprises, at the side of shutter glasses, the steps of receiving a message indicating display of a first portion of the two portions; turning dark of the shutter glasses and turning refraction direction of the shutter glasses towards a first position; turning transparent of the shutter glasses; receiving a message indicating display of a second portion of the two portions; turning dark of the shutter glasses and turning refraction direction of the shutter glasses towards a second position; and turning transparent of the shutter glasses.

8 Claims, 4 Drawing Sheets

(51) Int. Cl.
*H04N 13/337* (2018.01)
*H04N 13/341* (2018.01)
*H04N 13/354* (2018.01)
*G09G 3/00* (2006.01)
*G02B 27/12* (2006.01)
*G02B 26/08* (2006.01)
*G02B 27/10* (2006.01)
*G02B 30/36* (2020.01)

(52) U.S. Cl.
CPC ........... *G02B 27/126* (2013.01); *G09G 3/003* (2013.01); *G09G 3/005* (2013.01); *G09G 3/36* (2013.01); *H04N 13/337* (2018.05); *H04N 13/341* (2018.05); *H04N 13/354* (2018.05); *G02B 30/36* (2020.01); *H04N 2213/008* (2013.01)

(58) Field of Classification Search
CPC .......... G09G 3/003; G09G 3/005; G09G 3/36; H04N 13/0434; H04N 13/0438; H04N 13/045
USPC ........................................................... 348/43
See application file for complete search history.

(56) References Cited

U.S. PATENT DOCUMENTS

| | | | |
|---|---|---|---|
| 2009/0201362 A1 | 8/2009 | Shestak et al. | |
| 2010/0091095 A1* | 4/2010 | Sung | H04N 13/0438 348/53 |
| 2011/0134213 A1* | 6/2011 | Tsukagoshi | H04N 13/0048 348/43 |
| 2011/0149053 A1 | 6/2011 | Ito et al. | |
| 2012/0007861 A1 | 1/2012 | Wu et al. | |
| 2013/0314515 A1 | 11/2013 | Shestak et al. | |

FOREIGN PATENT DOCUMENTS

| | | |
|---|---|---|
| CN | 1300038 | 6/2001 |
| CN | 1342911 | 4/2002 |
| CN | 102073140 | 5/2011 |
| EP | 2631702 A2 | 8/2013 |
| JP | 1-277813 A2 | 11/1989 |
| JP | 3042695 | 2/1991 |
| JP | 3163490 | 7/1991 |
| JP | 11150743 | 6/1999 |
| JP | 2002199416 | 7/2002 |
| JP | 2004145367 | 5/2004 |
| JP | 2011-030186 A | 2/2011 |
| JP | 2012-053236 A | 3/2012 |
| JP | 2013-105000 A | 5/2013 |
| JP | 2014-500974 A | 1/2014 |
| JP | 2014-98855 A | 5/2014 |
| WO | 2012/053874 A2 | 4/2012 |

OTHER PUBLICATIONS

Wismeijer et al., "The Use of Virtual Reality and Audiovisual Eyeglass Systems as Adjunct Analgesic Techniques: A Review of the Literature", Virtual Reality and Audiovisual Distraction, vol. 30, No. 3, 2005, pp. 268-277.
Search Report dated Oct. 10, 2013.

* cited by examiner

METHOD AND APPARATUS FOR VIEWING AN IMAGE

This application claims the benefit, under 35 U.S.C. § 365 of International Application PCT/CN2012/087934, filed Dec. 29, 2012, which was published in accordance with PCT Article 21(2) on Jul. 3, 2014 in English.

TECHNICAL FIELD

The present invention relates to image presentation, and more particular relates to a method and apparatus for viewing an image of a size larger than display.

BACKGROUND

Persistence of vision is the phenomenon of the eye by which an afterimage is thought to persist for approximately one twenty-fifth of a second on the retina.

The vision of a human is not as simple as light registering on a medium, since the brain has to make sense of the visual data eyes provide and construct a coherent picture of reality. This is visual perception. The visual perception is the ability to interpret the surrounding environment by processing information that is contained in visible light, and for human, the information contained in visible light is visual data provided by eyes. The resulting perception is also known as eyesight, sight, or vision (and the terms can be attached with following adjectives: visual, optical, or ocular, e.g. optical vision).

Persistence of vision is widely used. And below list some usages.

In traditional TV, images are displayed in closely-timed sequence one after another. Viewers don't notice the fractional skips between images because that persistence of vision fills in the momentary gap to make the motion seem seamless.

In 3D system including a 3D display and shutter glasses, left and right images (or called views) are displayed sequentially and synchronized with the left eye glass and right eye glass, i.e. when left image is displayed, the left eye glass is set transparent by setting the shutter for left eye glass on and the right eye is set dark by setting the shutter for the right eye glass off. And the similar applies when the right image is displayed. When the display frequency (i.e. switching frequency of the shutter glasses) is high enough, e.g. 120 Hz or 240 Hz for both eyes, viewer can perceive 3D depth without feeling the flicker between left and right images.

Persistence of vision displays (POV display) composes an image by displaying one spatial portion of the image at a time in rapid succession (for example, one column of pixels every few milliseconds). A 2 dimensional POV display is often accomplished by means of rapidly moving a single row of LEDs along a linear or circular path. The effect is that the image is perceived as a whole by the viewer as long as the entire path is completed during the visual persistence time of the human eye. A further effect is often to give the illusion of the image floating in mid-air. A 3 dimensional POV display is often constructed using a 2D grid of LEDs which is swept or rotated through a volume. POV display devices can be used in combination with long camera exposures to produce light writing.

The present invention provides a method to display an image larger than the size of the display to the viewer.

SUMMARY

According to an aspect of present invention, it is provided a method for viewing an image that is wider or higher than the display screen, wherein, the image is evenly divided into two portions by using a line passing through centers of larger edges of the image compared to the display screen. The method comprises, at the side of shutter glasses, the steps of receiving a message indicating display of a first portion of the two portions; turning dark of the shutter glasses and turning refraction direction of the shutter glasses towards a first position; turning transparent of the shutter glasses; receiving a message indicating display of a second portion of the two portions; turning dark of the shutter glasses and turning refraction direction of the shutter glasses towards a second position; and turning transparent of the shutter glasses.

According to another aspect of present invention, it is provided a method for presenting a first image that is wider or higher than display screen of a display device, comprising, at the side of the display device, the steps of dividing the first image into two portions evenly, wherein, when the first image is wider than the display screen, the first image is divided horizontally, and when the first image is higher than the display screen, the first image is divided vertically; and displaying the two portions alternately, wherein when beginning to display any portion of the two portions, the display device informs shutter glasses of display of the portion.

According to another aspect of present invention, it is provided an apparatus for viewing an image that is wider or higher than display screen of a display device, wherein, the image is evenly divided into two portions by using a line passing through centers of larger edges of the image compared to the display screen, comprising a receiving module for receiving message from the display device; a shutter LCD for turning dark or transparent; a prism for refracting light from real position to visual position; wherein, in response to a message indicating display of a first portion of the two portions, the shutter LCD turns dark and the prism turns refraction direction towards a first position, and then the shutter LCD turns transparent; in response to a message indicating display of a second portion of the two portions, the shutter LCD turns dark and the prism turns refraction direction towards a second position; and then the shutter LCD turns transparent.

According to another aspect of present invention, it is provided an apparatus for presenting a first image that is wider or higher than the display, comprising a sending module for sending messages to shutter glasses; a dividing module for dividing the first image into two portions evenly, wherein, when the first image is wider than the display, the first image is divided horizontally, and when the first image is higher than the display, the first image is divided vertically; a displaying module for displaying the two portions alternately; wherein when beginning to display any portion of the two portions, the sending module sends a message informing the shutter glasses of display of the portion.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings.

DETAILED DESCRIPTION

An embodiment of the present invention will now be described in detail in conjunction with the drawings. In the following description, some detailed descriptions of known functions and configurations may be omitted for clarity and conciseness.

The principle of the present invention provides a method and an apparatus for viewing an image of a size larger than display screen by taking advantage of the persistence of vision.

Figure 1A:
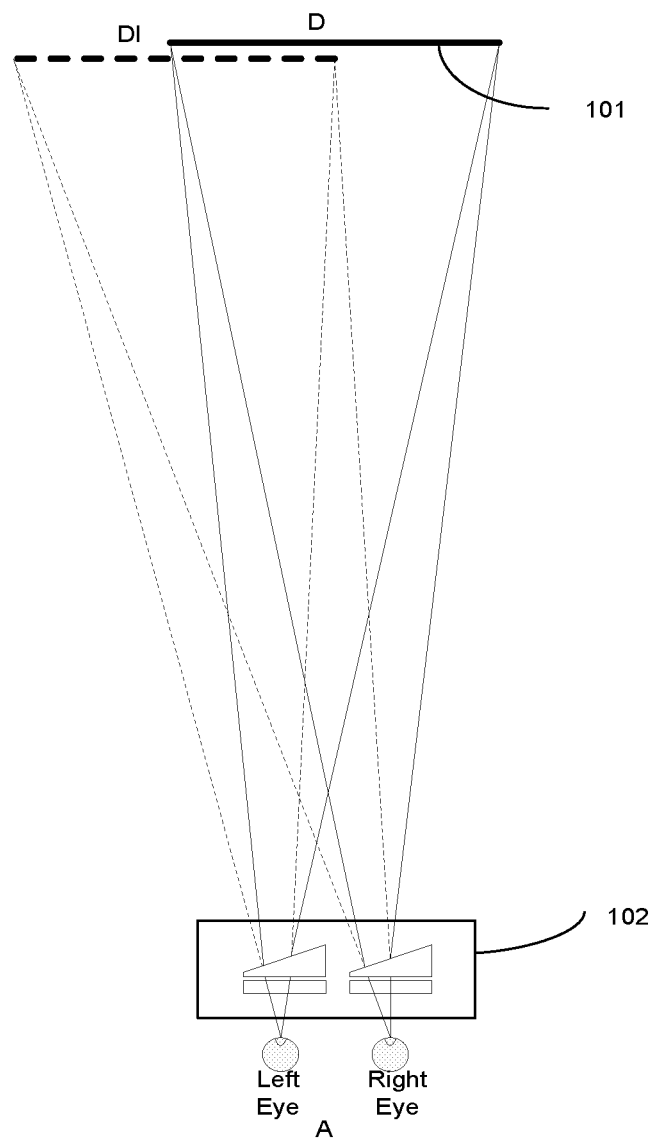
FIGS. 1A and 1B are block diagrams for system according to an embodiment of the present invention.
Figure 1B:
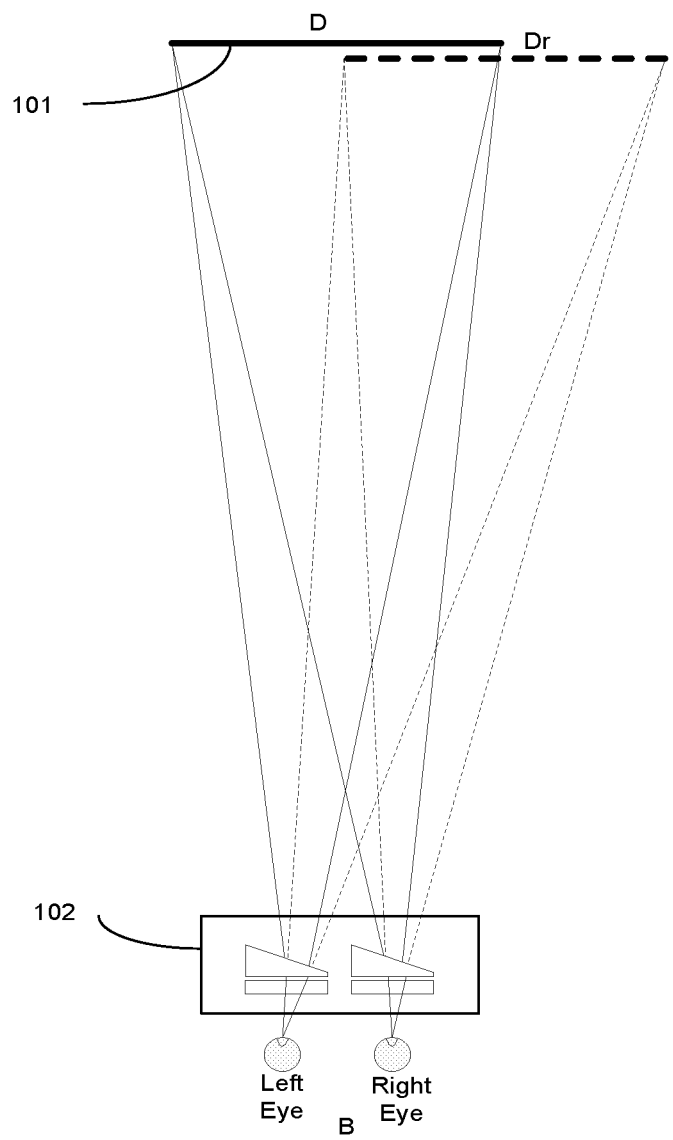

FIGS. 1A and 1B are block diagrams for system according to an embodiment of the present invention. In this embodiment, the image is twice wider of the display screen. As shown in the diagrams, the system comprises a display 101 for displaying content and a pair of shutter glasses 102 through which a viewer view the image. According to an embodiment of present invention, an image wider is divided into two image portions (sub-images) evenly and horizontally. A left portion and right portion of the two image portions are displayed alternately on the display. FIG. 1A shows the presentation of the left portion while FIG. 1B shows the presentation of the right portion. As shown in the FIG. 1A, the left portion is displayed on the display 101 and a viewer sees the left portion through the shutter glasses. Because the shutter glass refracts the left portion from its real spatial position from D to a visual position DI, it makes the viewer feel that the left portion is displayed in the visual position DI. And it's similar that in the FIG. 1B the right portion is felt by the viewer to be displayed in the visual position Dr after the shutter glasses changes the refraction direction. Because the left portion and the right portion are displayed alternately and rapidly, the persistence of vision makes the viewer perceive the entire image based on the seen left portion and the seen right portion. It shall note it also possible to display the right portion first and then the left portion. It shall also note the principle of the present invention can apply to a sequence of images (e.g. a video etc.), and display sequence can be left portion of first image of the image sequence, right portion of the first image, left portion of second image, right portion of the second image etc. or right portion of first image, left portion of the first image, right portion of second image, left portion of second image etc.

Figure 2:
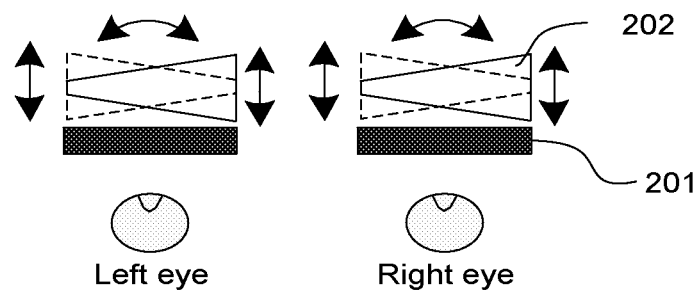
FIG. 2 is a block diagram showing the shutter glasses according to the embodiment of the present invention.

FIG. 2 is a block diagram showing the shutter glasses according to the embodiment of the present invention. The shutter glasses 102 comprises a receiving module (not shown) for receiving messages from the display, a shutter LCD 201 and an adjustable prism 202 for each eye glass. The shutter LCD 201 can be controlled by signals to be transparent or dark (or called open or close), and the adjustable prism 202 can be controlled by signals to change its refraction direction as shown in the FIGS. 1A and 1B.

Figure 3:
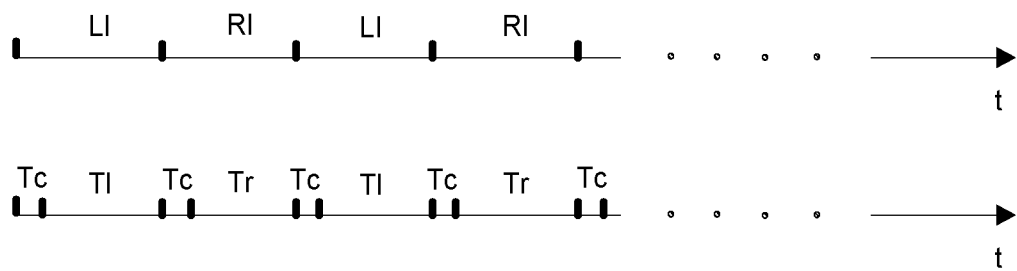
FIG. 3 is a diagram showing the synchronization relationship between the display of left portion (LI) and right portion (RI) of the image, open and close of the shutter LCD and change of refraction direction of the prism according to the embodiment of the present invention.

FIG. 3 is a diagram showing the synchronization relationship between the display of left portion (LI) and right portion (RI) of the image, open and close of the shutter LCD and change of refraction direction of the prism. As shown in the FIG. 3, the left portion and the right portion are displayed alternately. And at the time of changing to display the left portion, the shutter LCD is closed and the prism is changed to left refraction direction corresponding to the left portion as shown in the FIG. 1A. The total time takes Tc. Then the shutter LCD is open till the time when it is changed to display the right portion (as indicated by TI). And the similar process happens to the display of the right portion. In order for synchronization, IR (infrared signal) or other wireless technologies (e.g. Bluetooth etc.) can be used for informing the change of display by the display 101 to the shutter glasses 102. Herein, in order to perfect the embodiment, U.S. Pat. No. 4,634,241 can be used to solve the difference in the angle of refraction by wavelength in the prism, and U.S. Pat. No. 4,953,956 can be used to control the refraction angle manually or automatically based on the distance from the display device to the viewer.

Although in the above embodiment, the actual image is twice as wide as the display screen, it is possible that the actual image is less than twice size of the display screen.

Although in the above embodiment, the width is largened, it is also possible that the height is largened so as to enable the viewer to see an enlarged visual display along the vertical direction.

Figure 4:
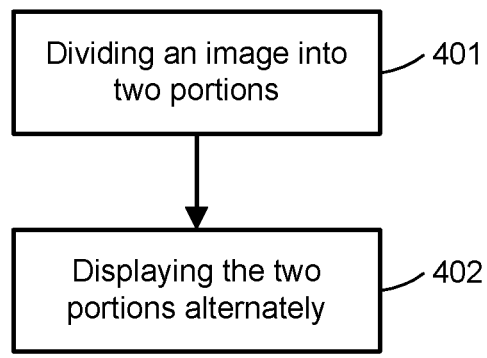
FIG. 4 is a flow chart showing a method for presenting an image larger than the display 101 on the display 101 according to an embodiment of the present invention.

FIG. 4 is a flow chart showing a method for presenting an image larger than the display 101 on the display 101 according to an embodiment of the present invention.

In the step 401, the image is divided into two portions, either vertically or horizontally. Normally, the image is either wider or higher than the display 101. We need to evenly divide it into two portions by using a line passing through centers of larger edges of the image compared to the display. In other words, when the image is wider than the display, the image is divided horizontally by using the line passing through centers of the wide edges of the image. And when the image is higher than the display, the image is divided vertically by using the line passing through centers of the height edges of the image.

In the step 402, the two portions are displayed on the display 101 alternately and repeatedly. Herein, when the display 101 begins to display a portion, it sends a message to instruct the shutter glasses for the display. It shall note that the message can be implemented in many ways. For example, the message contains an explicit indication about left portion and right portion. In another example, after the initiation of the shutter glasses with the display 101 enabling the shutter glasses to know which portion between the left portion and the right portion is going to be displayed first, the message only indicates that the shutter glasses need changing its refraction direction.

It shall note above is the method of a single image. For a sequence of images, the left portions and right portions of the sequence of images are displayed sequentially and alternately. "alternately" here means the display of the left portion and the right portion of the same image. And "sequentially" means the images in the sequence of images are displayed in its sequence order.

In accordance with the steps described above, the display comprises a dividing module for performing the image division, a display module for display portions of the image and a sending module for sending messages, e.g. indicating the change on presentation (or display) of portions.

Figure 5:
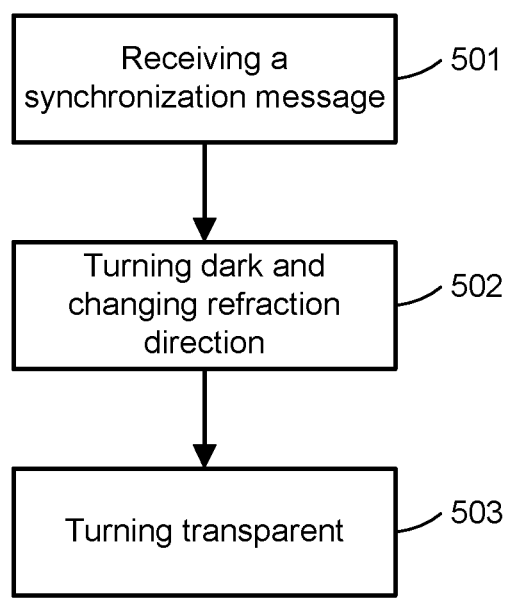
FIG. 5 is a flow chart showing a method for viewing an image larger than the display 101 according to the embodiment of the present invention.

FIG. 5 is a flow chart showing a method for viewing an image larger than the display 101 according to the embodiment of the present invention.

In the step 501, the shutter glasses receive a synchronization message indicating the refraction direction. As mentioned above, the synchronization message can explicitly indicate the refraction direction, or just indicate the change of the refraction direction.

In the step 502, the shutter glasses turn dark (i.e. blocking the passing through of the light) and change the refraction direction as indicated by the synchronization message.

In the step 503, after the completion of the change of the refraction direction performed in the step 502, the shutter glasses turn transparent, and are in a state waiting for receiving another synchronization message.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for controlling shutter glasses in order to view an image on a display screen through said shutter glasses, said image being wider or higher than the display screen, said image being divided into only two portions, called first and second portions, said first and second portions being displayed alternately on a display screen, the method comprising:
   receiving a message indicating display of the first portion of the image;
   turning dark the shutter glasses and turning refraction direction of the shutter glasses towards a first position responsive to the message;
   turning transparent the shutter glasses;
   receiving another message indicating display of the second portion of the image;
   turning dark of the shutter glasses and turning refraction direction of the shutter glasses towards a second position responsive to the another message; and
   turning transparent of the shutter glasses,
   wherein the turning refraction direction in the first position and the turning refraction direction in the second position cause displays of the first portion and of the second portion through said shutter glasses at the first position and at the second position.

2. A method for displaying a first image on a display screen of a display device, said first image being wider or higher than the display screen, said method comprising, at the display device:
   dividing the first image into only two portions, called first and second portions, horizontally or vertically; and
   displaying said first and second portions alternately and in different positions, wherein when beginning to display any portion of the two portions, the display device informs using appropriate messages shutter glasses of display of the portion.

3. The method of the claim 2, wherein the two portions of the first image are displayed repeatedly.

4. The method of the claim 2, wherein a second image is going to be displayed following the first image, further comprising:
   dividing the second image into only two portions in the same way as for the first image; and
   displaying the two portions of the second image alternately, wherein when beginning to display any portion of the two portions, the display device informs using further appropriate control messages to shutter glasses of display of the portion and wherein the two portions of the second image are displayed in a same order as for the first image.

5. An apparatus for viewing an image on a display screen of a display device, said image being wider or higher than the display screen, said image being divided into only two portions, called first and second portions, said first and second portions being displayed alternately on a display screen, said apparatus comprising:
   a receiving module for receiving messages from the display device;
   a shutter LCD for turning dark or transparent; and
   a prism for refracting light from real position to visual position;
   wherein in response to a message indicating display of the first portion of the image, the shutter LCD turns dark and the prism turns refraction direction towards a first position, and then the shutter LCD turns transparent; in response to a message indicating display of the second portion of the image, the shutter LCD turns dark and the prism turns refraction direction towards a second position; and then the shutter LCD turns transparent, wherein the turning refraction direction in the first position and the turning refraction direction in the second position cause displays of the first portion and of the second portion through said shutter glasses at the first position and at the second position.

6. An apparatus for displaying a first image, said first image being wider or higher than the display screen, said apparatus comprising:
   a sending module for sending control messages to shutter glasses;
   a dividing module for dividing the first image into only two portions, called first and second portions, horizontally or vertically; and
   a displaying module for displaying said first and second portions alternately and at different positions;
   wherein when beginning to display any portion of the two portions, the sending module sends a message informing the shutter glasses of display of the portion.

7. The apparatus of the claim 6, wherein the display module is further used to display the two portions of the first image repeatedly.

8. The apparatus of the claim 6, wherein a second image is going to be displayed following the image,
   the dividing module is further used to divide the second image into two portions in the same way as for the first image; and
   the display module is further used to display the two portions of the second image alternately, wherein when beginning to display any portion of the two portions, the sending module sends another control message informing the shutter glasses of display of the portion and wherein the two portions of the second image are displayed in a same order as for the first image.

* * * * *